(12) United States Patent
Chang et al.

(10) Patent No.: US 6,342,893 B1
(45) Date of Patent: Jan. 29, 2002

(54) METHOD FOR TESTING THE CORRECTNESS OF IMAGE DATA TRANSITED AMONG MEMORIES

(75) Inventors: Vam Chang, Taipei (TW); Judith Xi, Shanghai (CN)

(73) Assignee: Inventec Corporation, Taipei (TW)

( * ) Notice: Subject to any disclaimer, the term of this patent is extended or adjusted under 35 U.S.C. 154(b) by 0 days.

(21) Appl. No.: 09/232,709

(22) Filed: Jan. 19, 1999

(51) Int. Cl.$^7$ .............................................. G06F 13/00
(52) U.S. Cl. ........................ 345/530; 345/561; 345/562
(58) Field of Search ................................. 345/511, 507, 345/508, 561, 562, 530

(56) References Cited

U.S. PATENT DOCUMENTS

| | | | | |
|---|---|---|---|---|
| 4,978,226 A | * | 12/1990 | Moriya et al. | 358/538 |
| 5,218,674 A | * | 6/1993 | Peaslee et al. | 395/525 |
| 5,388,198 A | * | 2/1995 | Layman et al. | 395/333 |
| 5,774,134 A | * | 6/1998 | Saito | 345/509 |
| 5,861,893 A | * | 1/1999 | Sturgess | 345/525 |

\* cited by examiner

Primary Examiner—Mark Zimmerman
Assistant Examiner—Mackly Monestime
(74) Attorney, Agent, or Firm—McDermott, Will & Emery

(57) ABSTRACT

A method used to test the correctness of image data transited between the system memory and display memory is described as follows. First, a image data A is stored in a location B of the system memory. Then, the data of image A and a location C of display memory are stored into a Bitblt temporary storage means. The Bitblt engine is used to transit the data of image A stored in the location B of system memory to the location C of display memory. Then, the data of location C, location D of display memory, and image A are input into the Bitblt temporary storage means. The Bitblt engine is used to transit the data of image A from the location C to the location D of display memory. The data of image A and location E are input into the Bitblt temporary storage means. The Bitblt engine is used to transit the data of image A from the location D into the location E of the system memory. Then, the image data A in location B of system memory is compared with the image data A in location E of system memory for determining whether the image data A is correct after the transiting procedure completed.

16 Claims, 4 Drawing Sheets

METHOD FOR TESTING THE CORRECTNESS OF IMAGE DATA TRANSITED AMONG MEMORIES

FIELD OF THE INVENTION

The present invention relates to a method for testing the image data transited among the memories, and more specifically, to a method for performing the whole Bit Block Transit(Bitblt) test by controlling the temporary storage means directly but in Windows system.

BACKGROUND OF THE INVENTION

In general, there are various methods used to test components in manufacturing process of computer industry. Various methods are used to detect the cooperation of different devices except to find out the devices with defects.

It is important to test the correctness of the image data transited between the system memory and the display memory. Especially, when the image data transited among memories have some mistakes, the operator can not ascertain what meaning the image data illustrated on screen.

In conventional technique, the Bit Block transit(Bitblt) hardware engine situated on the display chip is used to transit image data between the system memory and display memory. Since the correctness test of data transited between the system memory and display memory, performed by the Bitblt engine is more effective and rapid than by the software, the Bitblt hardware engine is used to perform the transiting procedure among the memories in order to upgrade the efficiency of handling image data.

However, a driver installed in Windows system is required for the Bitblt hardware engine to transit image data and to perform the correctness test currently. In the procedures of producing computer systems, the step to install the Windows system is required firstly for driving the Bitblt hardware engine to perform the correctness test, and another step to uninstall the Windows system is also required after the test completed. Thus, much time is cost to perform these extra steps in the whole testing procedure.

SUMMARY OF THE INVENTION

A disclosed method used to test the correctness of image data transited between the system memory and display memory is described as follows. First, an image data A is stored in a location B of the system memory. Then, the data of image A and a location C of display memory are stored into a Bitblt temporary storage means. The Bitblt engine is used to transit the data of image A stored in the location B of system memory to the location C of display memory. Then, the data of location C, location D of display memory, and image A are input into the Bitblt temporary storage means. The Bitblt engine is used to transit the data of image A from the location C to the location D of display memory. The data of image A and location E are input into the Bitblt temporary storage means. The Bitblt engine is used to transit the data of image A from the location D into the location E of the system memory. Then, the image data A in location B of system memory is compared with the image data A in location E of system memory for determining whether the image data A is correct after the transiting procedure completed.

The first part is completed when the image data A in the location B of the system memory is consistent with the image data A in the location E of the system memory. Then, performing the second part, a monochrome image data H is stored into the location I of system memory. The data of monochrome image H and location J of the display memory are input into the Bitblt temporary storage means. The monochrome image H is transited by using the Bitblt engine from the location I of system memory into the location J of display memory. Then, the monochrome image data H in location J is compared with the monochrome image data H in location I to determine whether the colors extended are correct after the monochrome image data H transited.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

A method is disclosed in the present invention used to test the correctness of image data transited between the system memory and display memory. Especially, the Bit Block Transit(Bitblt) test can be performed directly in DOS system by controlling a Bitblt temporary storage means according to the method proposed in the present invention. The detail of the method is described as follows.

Figure 1:
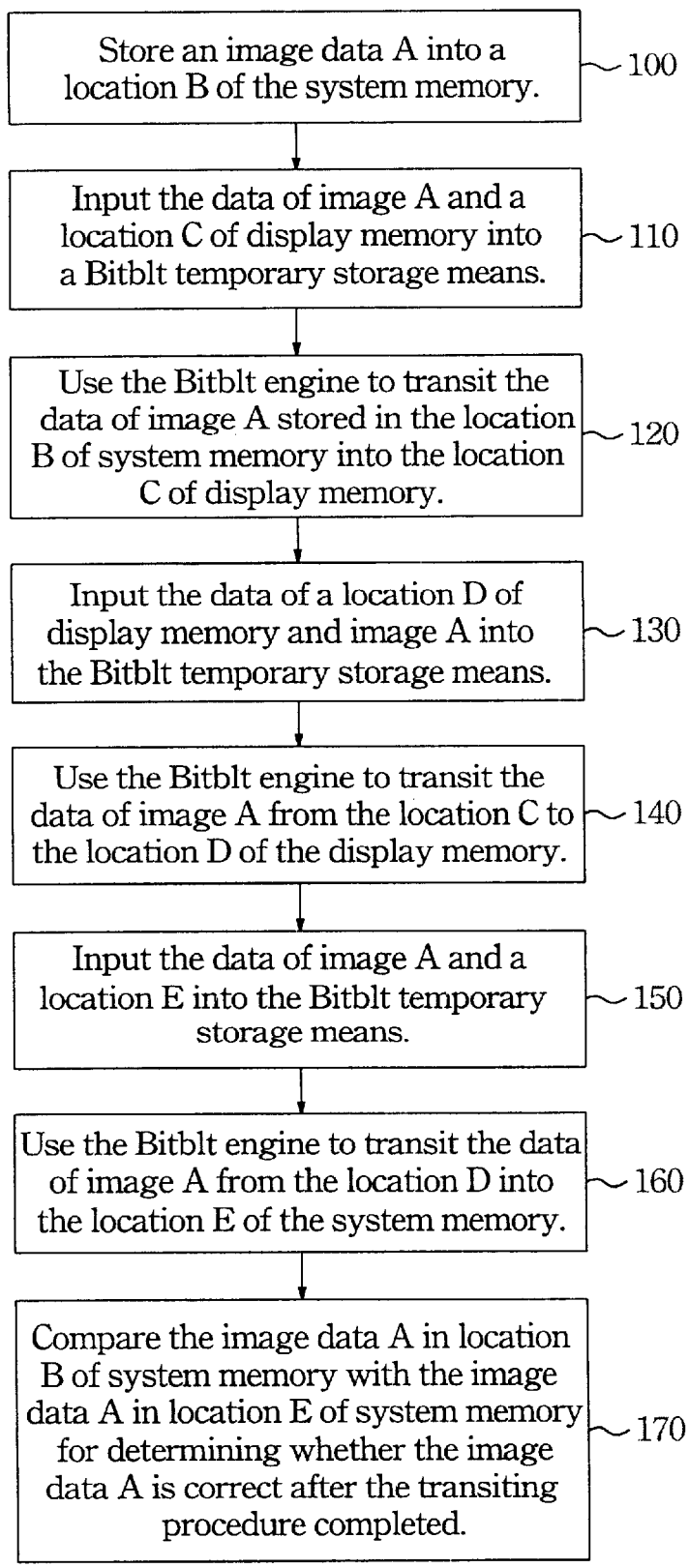
FIG. 1 is a flow chart illustrating the steps for testing the correctness of image data transited between the system memory and display memory in accordance with the present invention.

Referring to FIG. 1, in a preferred embodiment, a flow chart illustrates the steps for testing the correctness of image data transited between the system memory and display memory. The step 100 is performed to save an image data A into a location B of the system memory. Then, the step 110 is performed to input the data of the image A and a location C of display memory into a Bitblt temporary storage means. It is noted that the image data hereof including of the word block, figure block, image graph, and etc. The step 120 is performed to transit the data of the image A from the system memory into the display memory, namely to transit the data of image A stored in the location B of system memory to the location C of display memory. Then, the step 130 is performed to input the data of location C, a location D of the display memory, and image A into the Bitblt temporary storage means. The step 140 is performed to use the Bitblt engine for transiting the data of image A from the location C to the location D in the display memory. The step 150 is performed to input the data of image A and location E into the Bitblt temporary storage means, wherein the location E is in the system memory. The step 160 is performed to use a Bitblt engine for transiting the data of image A from the location D into the location E of the system memory. The step 170 is performed to compare the image data A in location B of system memory with the image data A in location E of system memory for determining whether the image data A is correct after the transiting procedure completed.

Figure 2:
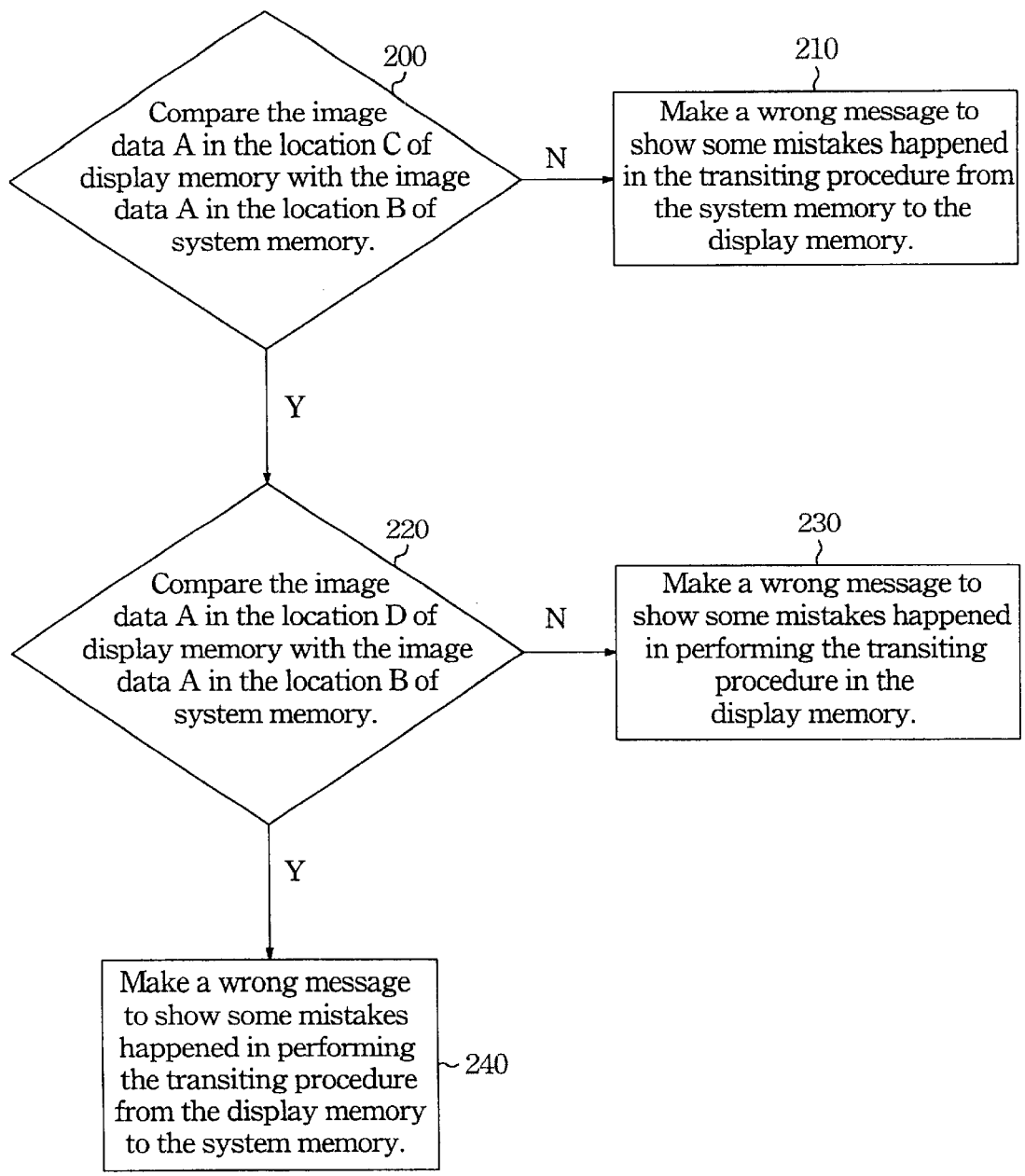
FIG. 2 is a flow chart illustrating the steps of determining whether the image data having mistakes in transiting procedure in accordance with the present invention.

In general, there are some mistakes occurred in the whole transiting image procedure when the image data A in the location E of system memory is not consistent with the image data A in the location B of system memory. Please refer to FIG. 2, the flow chart illustrates the procedure to determine which step the mistakes happened. First, the step 200 is performed to compare the image data A located in the location C of display memory with the image data A located in the location B of system memory, wherein the image data A in location C is loaded to perform the comparison procedure by proper software methods. When the image data A in location C is not consistent with the image data A in location B, the step 210 is performed to generate a wrong message for showing some mistakes happened in the transiting procedure from the system memory into the display memory. Relatively, when the image data A in location C is consistent completely with the image data A in location B, the step 220 is performed to compare the image data A located in the location D of display memory with the image data A located in the location B of system memory. As described above, the image data A in location D is output to perform the comparison step by some software methods. When the image data A in location D is not consistent with the image data A in location B, the step 230 is performed to generate a wrong message for showing some mistakes happened in performing the transiting procedure in the display memory. Relatively, when the image data A in location D is consistent completely with the image data A in location B, the step 240 is performed to make the wrong message for showing some mistakes happened in performing the transiting procedure from the display memory into the system memory.

As note, there is no mistake happened in the whole transiting procedure when the image data A in the location B of the system memory is consistent completely with the image data A in the location E of the system memory if the step 170 is performed. However, the monitor produced currently have multiple colors but single color. Relatively, the method used to test the correctness of image transited among memories in DOS system just can include two colors, such as original black and white( the colors of image and background in DOS system on screen), but multiple colors. Namely, the procedures from the step 100 to 170 can be only used to determine the correctness of an image data with two colors of black and white transited between the system memory and display memory, and not to determine the correctness of an image data with some different colors. Thus, it is required to perform an extending procedure for extending the colors of the image data transited among the memories.

Figure 3:
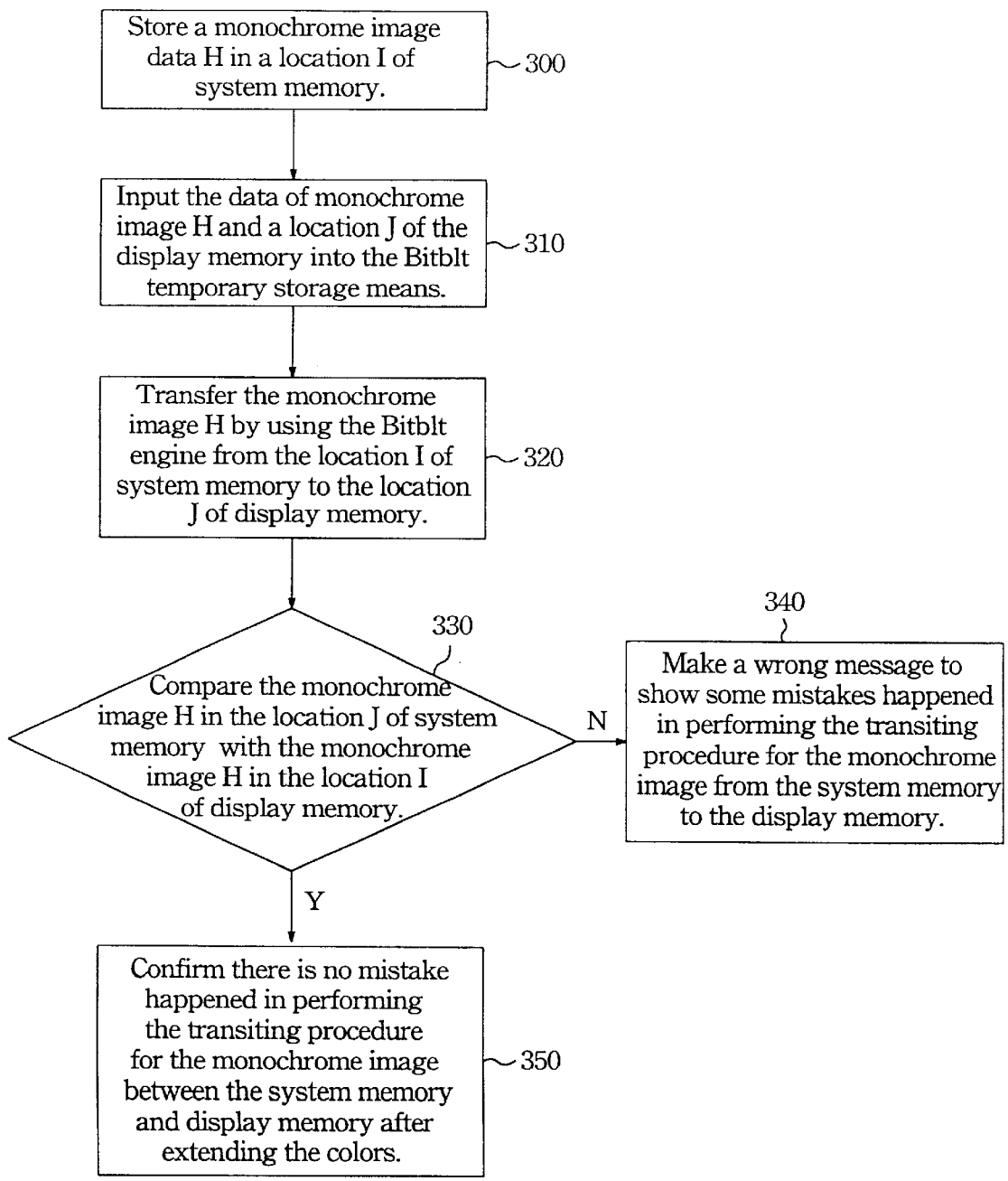
FIG. 3 is a flow chart illustrating the steps of extending the colors of image data to perform the correctness test in accordance with the present invention.

Please refer to FIG. 3, the flow chart illustrates the steps to extend the colors of image data for performing the correctness test again. It is noted that there is only the difference in colors between the image and background when an image data showed in the DOS system. That is why only two colors can be used in one time to illustrate the image data and background respectively for performing color extending procedure. Namely, when the extending procedure performs once, only two colors can be extended in a meanwhile. Still referring to the flow chart depicted in FIG. 3, the step 300 is performed to store a monochrome image data H into the location I of system memory. Then, the step 310 is performed to input the data of monochrome image H and location J of the display memory into the Bitblt temporary storage means. The step 320 is performed to transfer the monochrome image H by using the Bitblt engine from the location I of system memory into the location J of display memory. The step 330 is then performed to compare the monochrome image H in the location J of system memory with the monochrome image H in the location I of display memory. As noted, the monochrome image H can be output from the location J of display memory firstly for performing the compare by using the proper software method. When the monochrome image data H in location J is not consistent with the monochrome image data J in location I, the step 340 is performed to generate a wrong message for showing some mistakes happened in performing the transiting procedure about the monochrome image from the system memory to the display memory. Relatively, when the image data H in location J is consistent completely with the image data H in location I, the step 350 is performed to confirm that there is no mistake happened when the monochrome image transited between the system memory and display memory after extending the colors of the monochrome image. Then, various colors can be replaced to perform the extending procedure by executing the steps 300 to 340, for testing the correctness of the monochrome image transited between the system memory and display memory.

Figure 4:
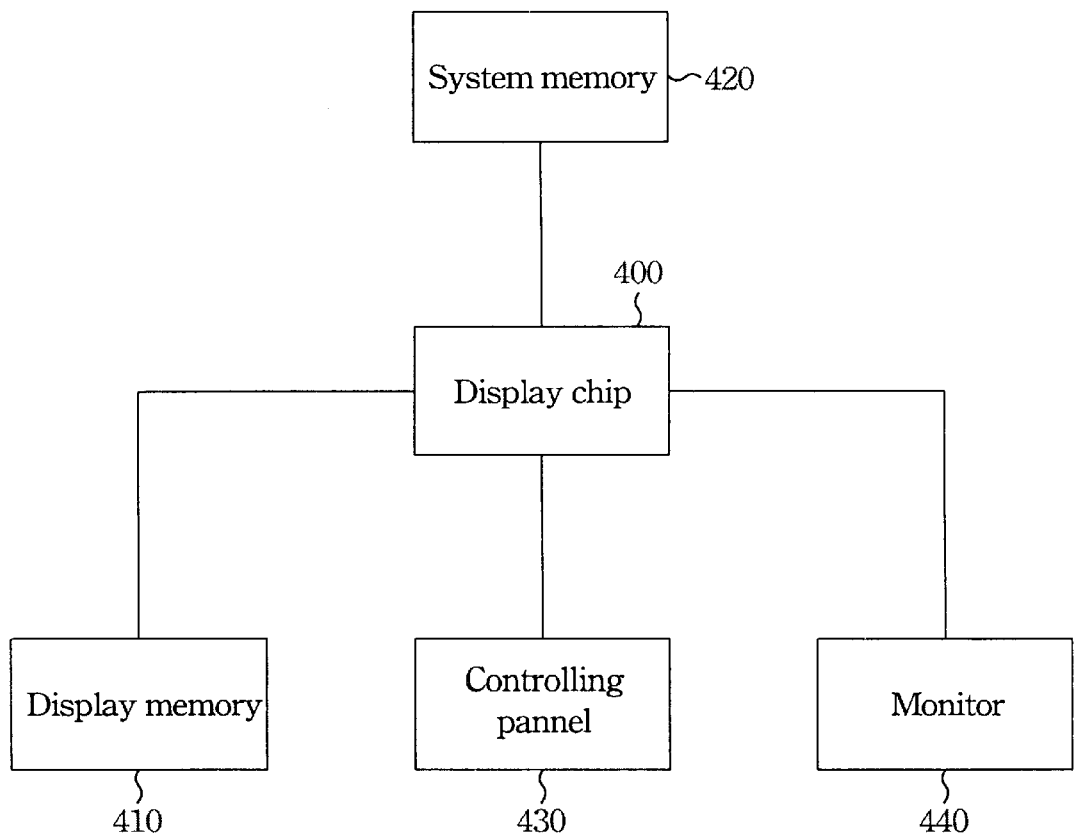
FIG. 4 is a system block illustrating the frames of the testing system used to test the correctness of image data transited between the system memory and display memory in accordance with the present invention.

Referring to FIG. 4, the frames of the testing system used to test the correctness of image data transited between the system memory and display memory are illustrated. The testing system is composed of a display chip 400 coupled between the display memory 410 and system memory 420, and the display chip 400 is also coupled with a controlling pannel 430 and a monitor 440. Beside, the display chip 400 further comprises the Bitblt engine and the Bitblt temporary storage means, wherein the Bitblt temporary storage means is used to store the data of image data and location; and the Bitblt engine is used to transit the image data to the desired location. The Bitblt engine and the Bitblt temporary storage means are controlled by the controlling pannel 430 to transit the image data between the system memory 420 and the display memory 410. The monitor 440 is used to confirm the operations of display chip 400.

In a conclusion, the present invention has the following advantages. First, the method and system provided in accordance with the present invention can be used to test the correctness of the image data transited between the system memory and display memory but in Windows system. For the manufactures of computer hardware, the extra steps that installs the Windows system for performing the test procedure is no longer needed. Second, due to the driver of the hardware is not required in the present invention, it is helpful to distinguish the defect sources between the hardware and software, and make the testing procedure to be more easier and convenient. Besides, the testing loop comprises of three steps of transiting image, such as from the system memory to display memory, from the display memory to display memory, and from the display memory to system memory, that can be used to determine where the mistake about the image data occurs. Thus, the time-cost can be reduced effectively.

As is understood by a person skilled in the art, the foregoing preferred embodiment of the present invention is illustrated of the present invention rather than limiting of the present invention. It is intended to cover various modifications and similar arrangements included within the spirit and scope of the appended claims, the scope of which should be accorded the broadest interpretation so as to encompass all such modifications and similar structure.

While the preferred embodiment of the invention has been illustrated and described, it will be appreciated that various changes can be made therein without departing from the spirit and scope of the invention.

What is claimed is:

1. A method of testing a correctness of image data transited between a computer system memory and a display memory, said method comprising the following steps of:

storing first image data at a first location of said computer system memory;

transiting said first image data into a second location of said display memory for generating second image data;

transiting said second image data stored at said second location of said display memory into a third location in said display memory for generating third image data;

transiting said third image data stored at said third location of said display memory into fourth location of said computer system memory for generating fourth image data;

comparing said first image data stored at said first location and said fourth image data stored at said fourth location of said computer system memory; and comparing said second image data stored at said second location of said display memory with said first image data stored at said first location of said computer system memory when said fourth image data stored at said fourth location is not consistent with said first image data stored at said first location in order to determine whether at least one mistake occurs in transiting procedure.

2. The method of claim 1, further comprising the following steps when said fourth image data stored at said fourth location is consistent with said first image data stored at said first location:

selecting two colors of a fifth monochrome image data;

storing said fifth monochrome image data at a fifth location of said computer system memory;

transiting said fifth monochrome image data into a sixth location of said display memory for generating a sixth monochrome image data therein;

altering two colors of said sixth monochrome image data; and comparing said sixth monochrome image data with said fifth monochrome image data to determine whether said sixth monochrome image data is consistent with said fifth monochrome image data.

3. The method of claim 1, further comprising the following steps when said second image data stored at said second location is consistent with said first image data stored at said first location:

comparing said second image data at said second location of said display memory with said third image data at said third location of said display memory; and determining faults occuring in said step to transit said image data within said display memory when said third image data is not consistent with said second image data.

4. The method of claim 3, further comprising the step of determining at least one fault occuring in said step used for transiting said image data from said display memory into said computer system memory when said third image data is consistent with said second image data.

5. The method of claim 1, further comprising the step of storing said first image data and an address of said second location into a Bit Block Transit (Bitblt) temporary storage means before transiting said first image data in said computer system memory into said second location in said display memory.

6. The method of claim 5, wherein said step of transiting said first image data in said computer system memory into said second location in said display memory is performed using a Bitblt engine.

7. The method of claim 1, further comprising the step of storing said second image data and an address of said third location into a Bitblt temporary storage means before transiting said second image data in said display memory into said third location in said display memory.

8. The method of claim 7, wherein said step of transiting said second image data in said display memory into said third location in said display memory is performed by using a Bitblt engine.

9. The method of claim 1, further comprising a step of storing said third image data and an address of said fourth location into a Bit Block Transit (Bitblt) temporary storage means before transiting said third image data in said display memory into said fourth location in said computer system memory.

10. The method of claim 9, wherein said step of transiting said third image data in said display memory into said fourth location in said computer system memory is performed using a Bitblt engine.

11. A method of testing the correctness of image data transited between a computer system memory and a display memory, said method comprising the steps of:

storing first image data at a first location of said computer system memory;

inputting data of said first image and an address of a second location of said display memory into a Bitblt temporarily storage means;

using a Bitblt engine to transit said first image data into said second location of said display memory for generating second image data;

inputting data of said second image and an address of a third location of said display memory into said Bitblt temporarily storage means;

using said Bitblt engine to transit said second image data into said third location of said display memory for generating a third image data;

inputting data of said third image and an address of a fourth location of said computer system memory into said Bitblt temporary storage means;

using said Bitblt engine to transit said third image data into said fourth location of said computer system memory for generating a fourth image data;

comparing said first image data at said first location and said fourth image data at said fourth location of said computer system memory; and comparing said second image data at said second location of said display memory with said first image data at said first location of said computer system memory when said fourth image data at said fourth location is not consistent with said first image data at said first location; and determining at least one mistake occurring in said step to transit said image data from said computer system memory to said display memory when said first image data is not consistent with said second image data.

12. The method of claim 11, further comprising the following steps when said fourth image data stored at said fourth location is consistent with said first image data stored at said first location:

determining two colors of a fifth monochrome image data;

storing said fifth monochrome image data at a fifth location of said computer system memory;

inputting data of said fifth monochrome image and an address of a sixth location into said Bitblt temporarily storage means;

using said Bitblt engine to transit said fifth monochrome image data into said sixth location of said display memory for generating a sixth monochrome image data;

altering two colors of said sixth monochrome image data; and comparing said sixth monochrome image data with said fifth monochrome image data to determine whether said sixth monochrome image data is consistent with said fifth monochrome image data after transiting said monochrome image data between said computer system memory and said display memory.

13. The method of claim 11, further comprising the following steps when said fourth image data at said fourth location is consistent with said first image data at said first location:

comparing said second image data at said second location of said display memory with said third image data at said third location of said display memory; and determining faults occuring in said step to transit said image data within said display memory when said third image data is not consistent with said second image data.

14. The method of claim 13, further comprising the step of determining at least one fault occuring in said step used for transiting said image data from said display memory into said computer system memory when said third image data is consistent with said second image data.

15. A method of testing a correctness of image data transited between a computer system memory and a display memory, said method comprising the following steps of:

storing first image data at a first location of said computer system memory;

transiting said first image data into a second location of said display memory for generating second image data;

transiting said second image data stored at said second location of said display memory into a third location in said display memory for generating third image data;

transiting said third image data stored at said third location of said display memory into a fourth location of said computer system memory for generating fourth image data;

comparing said first image data stored at said first location and said fourth image data stored at said fourth location of said computer system memory;

comparing said second image data stored at said second location of said display memory with said first image data stored at said first location of said computer system memory when said fourth image data stored at said fourth location is not consistent with said first image data stored at said first location in order to determine whether at least one mistake occurs in transiting procedure;

selecting two colors of a fifth monochrome image data when said fourth image data stored at said fourth location is consistent with said first image data stored at said first location;

storing said fifth monochrome image data at a fifth location of said computer system memory;

transiting said fifth monochrome image data into a sixth location of said display memory for generating a sixth monochrome image data therein;

altering two colors of said sixth monochrome image data; and comparing said sixth monochrome image data with said fifth monochrome image data to determine whether said sixth monochrome image data is consistent with said fifth monochrome image data.

16. A method of testing the correctness of image data transited between a computer system memory and a display memory, said method comprising the following steps of:

storing first image data at a first location of said computer system memory;

inputting data of said first image and an address of a second location of said display memory into a Bitblt temporary storage means;

using a Bitblt engine to transit said first image data into said second location of said display memory for generating second image data;

inputting data of said second image and an address of a third location of said display memory into said Bitblt temporarily storage means;

using said Bitblt engine to transit said second image data into said third location of said display memory for generating third image data;

inputting data of said third image and an address of a fourth location of said computer system memory into said Bitblt temporarily storage means;

using said Bitblt engine to transit said third image data into said fourth location of said computer system memory for generating fourth image data;

comparing said first image data at said first location and said fourth image data at said fourth location of said computer system memory in order to determine whether at least one mistake occurs in transiting procedure;

determining two colors of a fifth monochrome image data when said fourth image data stored at said fourth location is consistent with said first image data stored at said first location;

storing said fifth monochrome image data at a fifth location of said computer system memory;

inputting data of said fifth monochrome image and an address of a sixth location into said Bitblt temporarily storage means;

using said Bitblt engine to transit said fifth monochrome image data into said sixth location of said display memory for generating a sixth monochrome image data;

altering two colors of said sixth monochrome image data; and comparing said sixth monochrome image data with said fifth monochrome image data to determine whether said sixth monochrome image data is consistent with said fifth monochrome image data after transiting said monochrome image data between said computer system memory and said display memory.

* * * * *